(12) United States Patent
Heyes

(10) Patent No.: US 6,450,369 B1
(45) Date of Patent: Sep. 17, 2002

(54) BEVERAGE DISPENSER

(75) Inventor: Keith Heyes, Barnt Green (GB)

(73) Assignee: IMI Cornelius Inc., Anoka, MN (US)

( * ) Notice: Subject to any disclaimer, the term of this patent is extended or adjusted under 35 U.S.C. 154(b) by 0 days.

(21) Appl. No.: 09/565,428

(22) Filed: May 5, 2000

(30) Foreign Application Priority Data

May 8, 1999 (GB) .............................................. 9910581

(51) Int. Cl.[7] .................................................. B67D 5/56
(52) U.S. Cl. .................................................. 222/129.1
(58) Field of Search ......................... 222/129.1, 129.2, 222/129.3, 129.4, 145.5, 504

(56) References Cited

U.S. PATENT DOCUMENTS

| | | |
|---|---|---|
| 2,516,825 A | 7/1950 | Hejduk et al. |
| 2,748,982 A * | 6/1956 | Copping .................. 222/129.3 |
| 3,073,349 A | 1/1963 | Mitchell |
| 3,110,320 A | 11/1963 | Rosenberger |
| 3,653,548 A * | 4/1972 | Kotscha et al. .......... 222/129.1 |
| 3,695,290 A | 10/1972 | Evans |
| 3,851,668 A | 12/1974 | Benjamin |
| 3,955,794 A | 5/1976 | Hankosky |
| 4,108,134 A | 8/1978 | Malec |
| 4,726,493 A * | 2/1988 | Wallace et al. .......... 222/129.1 |
| 4,863,068 A * | 9/1989 | Smith ...................... 222/129.1 |
| 5,056,686 A * | 10/1991 | Jarrett ..................... 222/129.2 |
| 5,381,926 A * | 1/1995 | Credle, Jr. et al. ....... 222/129.2 |

FOREIGN PATENT DOCUMENTS

| | | |
|---|---|---|
| EP | 0 682 681 A1 | 1/1996 |
| FR | 2 416 424 | 8/1979 |
| GB | 625685 | 7/1949 |
| GB | 634362 | 3/1950 |
| GB | 1 507 353 | 5/1975 |
| GB | 1 444 429 | 7/1976 |
| GB | 1 551 170 | 10/1977 |

* cited by examiner

Primary Examiner—Lesley D. Morris
Assistant Examiner—Thach H. Bui
(74) Attorney, Agent, or Firm—Sten Erik Hakanson

(57) ABSTRACT

A beverage dispenser to provide desired ratios of mixed concentrate and diluent more accurately comprises a valve housing (10) having an inlet (12) and an outlet (44) for a concentrate and an inlet (14) and an outlet (30) for a diluent, a reciprocating piston (24) in a central passageway (22) between the inlets and outlets, the piston (24) being movable reciprocably between a first position in which flow to both outlets is blocked and a second position in which both outlets are open to flow, a flow rate sensor (20) for the concentrate and a flow rate sensor (40) for the diluent, the sensors being connected to a controller (50) whereby the diluent flow rate is adjusted by movement of the piston (24) according to the concentrate flow rate to achieve a predetermined ratio of concentrate to diluent for the dispensed beverage.

20 Claims, 5 Drawing Sheets

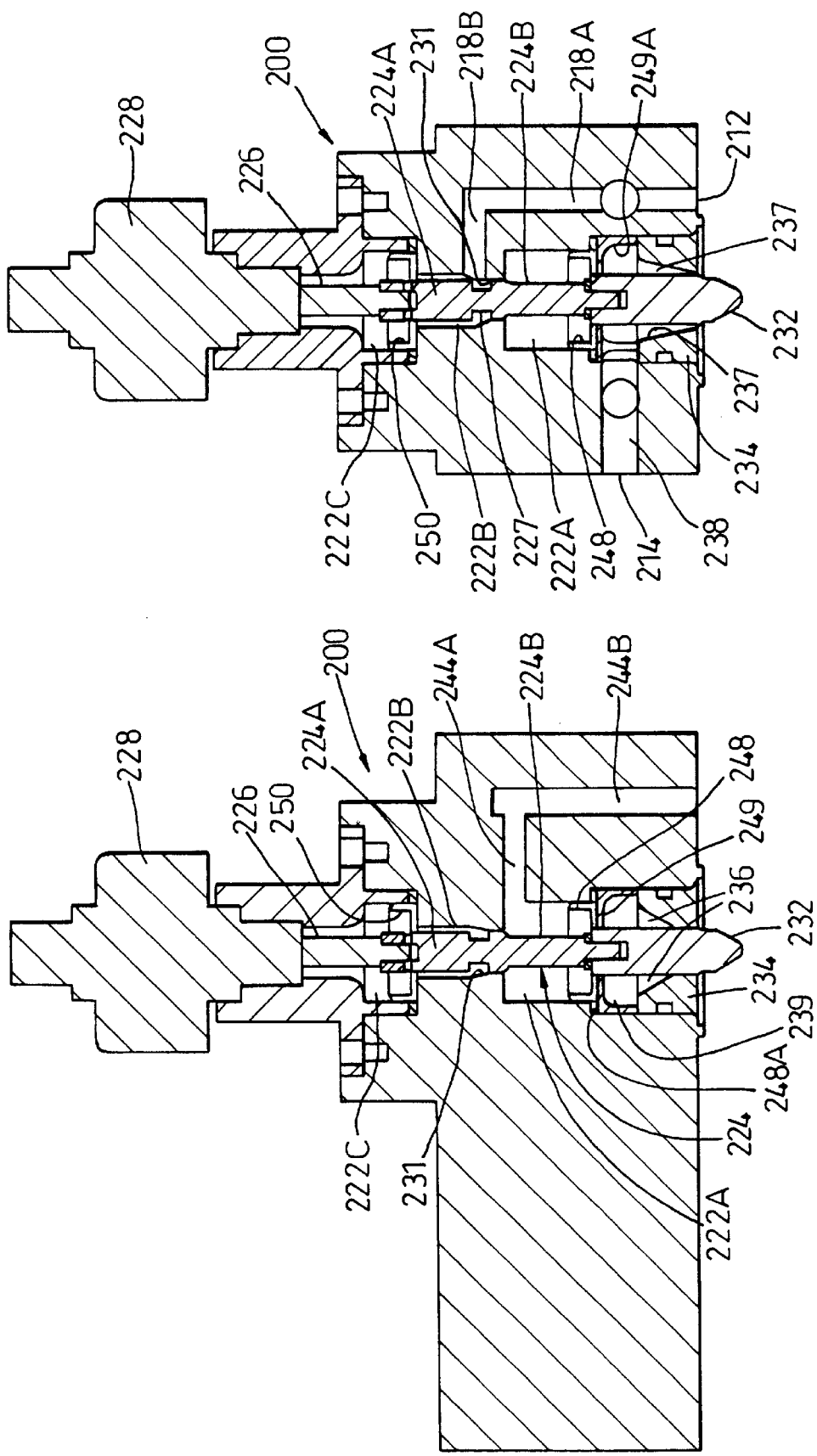

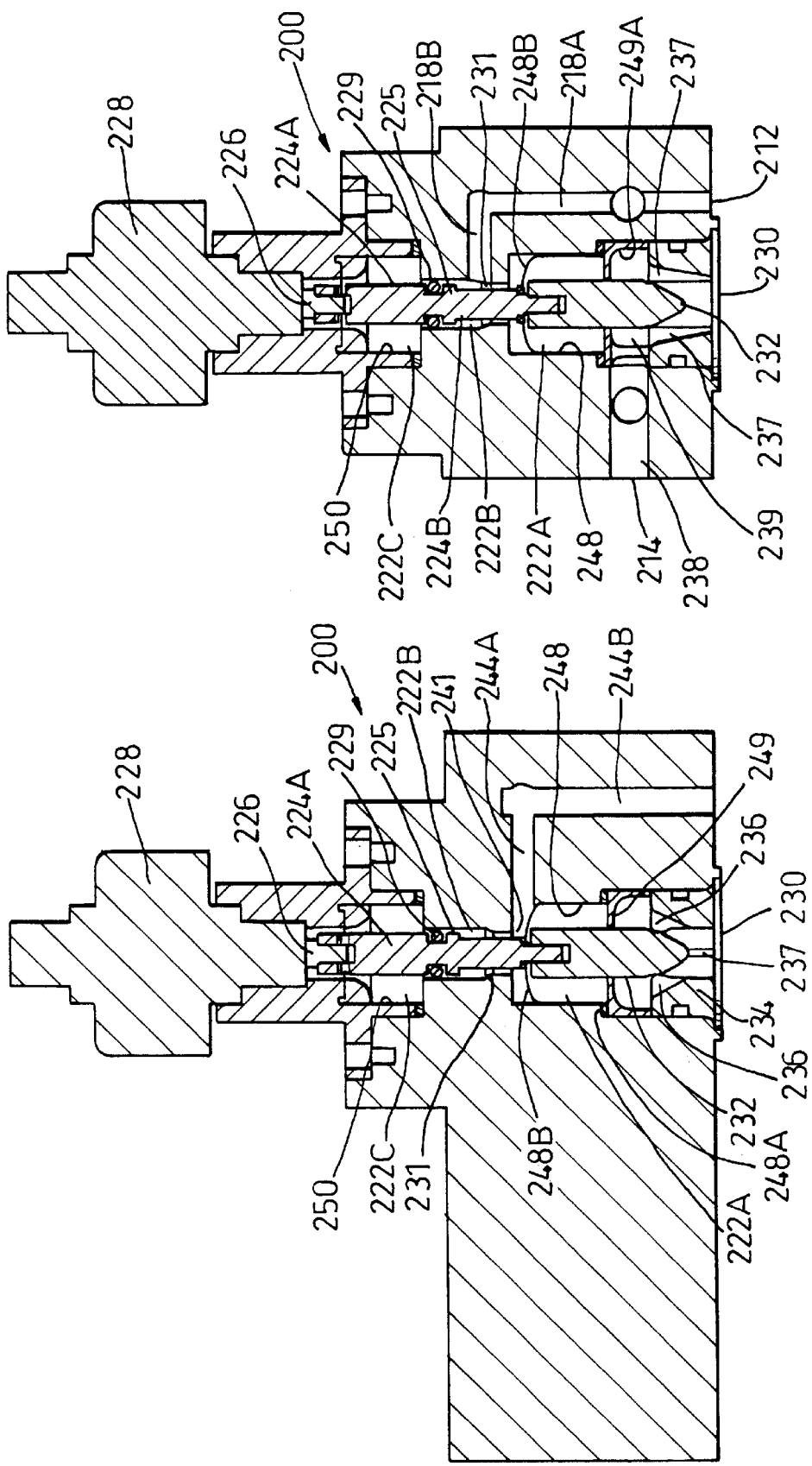

BEVERAGE DISPENSER

This invention relates to the dispensing of beverages. It is particularly concerned with the dispensing of beverages that are mixed at the point of sale from a concentrate, e.g. a syrup, and a diluent, usually plain or carbonated water and, although not intended to be limited thereto, will be described more specifically below with reference to such beverages.

It is an object of the invention to provide a dispenser whereby tie desired ratios of concentrate and diluent can be more accurately and reliably metered at an economical cost than is currently possible with existing dispense means.

Accordingly the invention provides a beverage dispenser comprising a valve housing having an inlet and an outlet for a concentrate and an inlet and an outlet for a diluent, a reciprocatable piston in a central passageway between the inlets and outlets, the piston being movable reciprocably between a first position in which flow to both outlets is blocked and a second position in which both outlets are open to flow, a flow rate sensor for the concentrate and a flow rate sensor for the diluent, the sensors being connected to a controller whereby the diluent flow rate is adjusted by movement of the piston according to the concentrate flow rate to achieve a predetermined ratio of concentrate to diluent for the dispensed beverage.

Thus any changes in the concentrate flow rate cause the controller to apply appropriate corresponding changes to the diluent flow rate to maintain the required ratio for the desired beverage.

Conveniently both outlets may lead directly into a mixing/dispense nozzle whereby the desired beverage can be dispensed into, e.g. a glass.

The reciprocating piston may be attached at one end to a setting mechanism to move it to open and close the outlets as required. The setting mechanism is preferably a stepper motor, e.g. of the pulsed, magnetically driven type, but may, for example, be a lever mechanism, a proportional solenoid actuator or a diaphragm operated mechanism.

The flow rate sensors may be, for example, flow turbines and the sensors may measure flow rate directly or by calculation from another property.

The invention enables a med beverage to be dispensed from equipment requiring only one setting mechanism for both the concentrate and the diluent.

Preferably, the piston is arranged to start to open the outlet for the diluent marginally before it starts to open the outlet for the concentrate as it may be disadvantageous to have any concentrate flow without the diluent, which could lead to undesirable stratification of the beverage. The concentrate outlet ten preferably fully opens while the diluent outlet is still only partially open. Further opening of the diluent outlet, up to its fully open extent then takes place with a constant fully open concentrate outlet.

The outlet for the diluent preferably includes a valve of the type described and claimed in our international patent application publication no. WO99/29619. That international application describes and claims a valve comprising a substantially rigid housing containing a passageway between an inlet and an outlet of the valve, a closure member movable in the passageway from a first position in which the valve is fully closed to a second position in which the valve is fully open, the closure member engaging the wall of the passageway to seal the passageway, the wall of the passageway or the closure member defining at least one groove, the groove having a transverse cross-section that increases in area in the downstream or upstream direction, whereby movement of the closure member from the first position towards the second position opens a flow channel through the groove. The groove(s) may be, for example, of tapering V-shape and will, for convenience, hereafter be referred to as "V-grooves" and the valves of this general type as "V-groove valves", although it will be appreciated that the grooves may, if desired, have a different tapering cross-section, e.g. of circular, rectangular or other shape.

It will be appreciated that when such a V-groove valve is utilised, the reciprocation piston may conveniently act as the closure member for the valve passageway.

The progressive increase or decrease in area of the groove flow channels can produce excellent linear flow through these V-groove valves, i.e. for a given pressure the flow rate is more directly proportional to the valve position than for conventional valves. This enables better control of the flow rate over the entire operating range of the valve.

Moreover, we have found that the V-groove arrangement may lead to reduced carbon dioxide "break out" from carbonated water so that the carbonation level of the dispensed drink remains at a satisfactory level.

The outlet valve means for the concentrate may simply be a passageway blocked by a seal on the piston and opened when the piston moves a sufficient distance to take the seal beyond the passageway. In one preferred embodiment, the passageway comprises a slot having a triangular shape, whereby movement of the piston initially opens the narrow end of the slot to flow of concentrate and then further movement exposes an increasing area of slot.

The piston may carry one or more seals to prevent the concentrate in the central passageway from leaking into the diluent inside the housing. The seals may be annular ring seals or diaphragm seals, the latter being moved from a compressed condition to an extended condition as the piston is moved to open the valve.

Essentially, the concentrate is allowed to flow through its outlet without continuous control of its flow rate once its outlet has been opened to the desired amount, e.g. fully opened but with its flow rate monitored. The concentrate flow rate is fed to the control means which then adjusts the diluent flow rate by appropriate movement of the piston by the setting mechanism to achieve the desired ratio for the concentrate/diluent mixture. It will be appreciated, therefore, that after the initial opening, and until closure of the valve, the cross-sectional area of the concentrate outlet will normally remain constant while the corresponding area for the diluent through its outlet valve can be increased or decreased as required.

Dependent on the flow rate measuring or calculation means used for the concentrates it may be necessary to monitor also the concentrate temperature as the viscosity of a viscous concentrate can significantly affect flow rate measurements. Again the necessary adjustments for viscosity effects can be pre-programmed into the control means.

The concentrate inlet may be provided with adjustment means that can be pre-set to provide a nominal flow rate of e.g. one fluid ounce per second or 4 fluid ounces per second dependent on the type and size of beverage normally to be dispensed out at the particular point of sale where the housing is installed.

The controller is conveniently an electronic controller, e.g. a microprocessor, which is preprogrammed to provide, in response to the concentrate flow rate data, actuation of the diluent valve opening to the amount necessary to maintain the desired ratio of the mixed beverage.

The invention provides significant advantages over conventional means of controlling mixing of concentrates and diluents. Conventionally the concentrate and the diluent each has a mechanical flow regulator and the overall flow rate and the concentrate/diluent ratio are pre-set. Such arrangements are prone to "drifting" with use of the equipment so that the ratio gradually changes. Moreover, they are susceptible to manual interference, i.e. attempts to re-set them other than by a qualified service engineer. They require regular call-outs of service engineers to adjust to the desired levels. The present invention, however, automatically monitors flow rates in such a manner that the desired ratio is maintained continuously and automatically, thereby reducing service calls and unauthorised tampering.

Embodiments of the invention will now be described by way of example only with reference to the accompanying drawings in which:

FIG. 5 is a diagrammatic sectional view through another valve housing of the invention with the valve closed;

FIG. 6 is a section through the valve of FIG. 5 taken at right angles to that of FIG. 5 with the valve still closed;

FIG. 7 is a similar section to that of FIG. 5 with the valve fully open; and

FIG. 8 is a similar section to FIG. 6 with the valve fully open.

Figure 1:
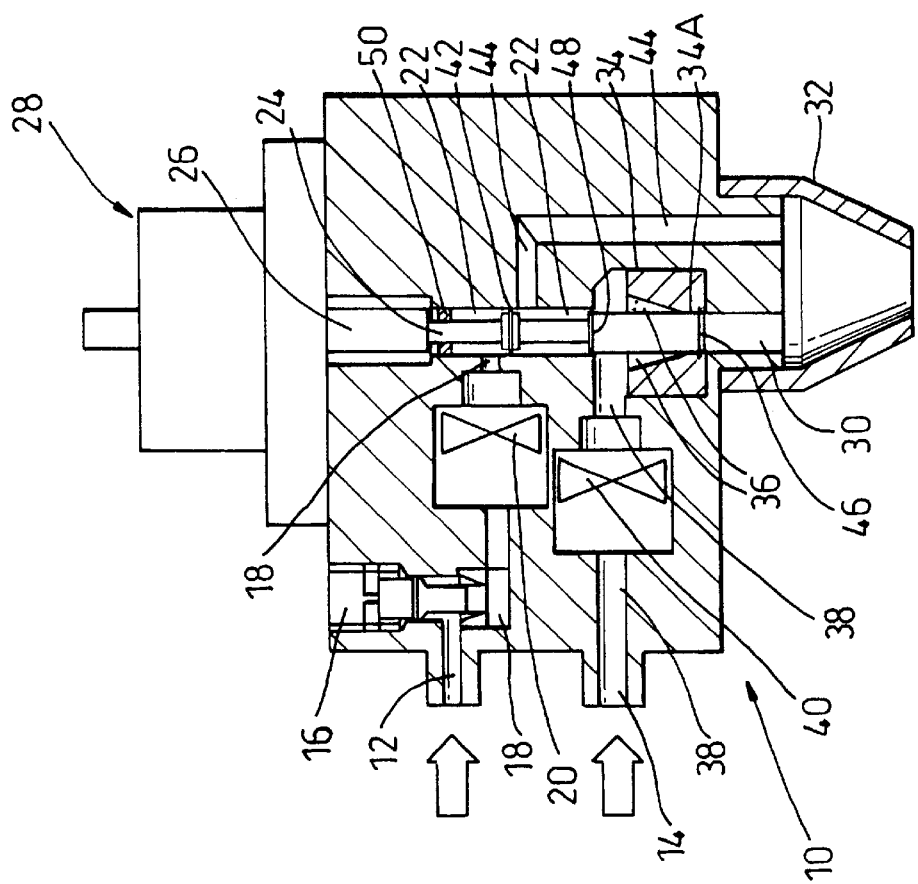
FIG. 1 is a part sectional diagram representation of a valve housing of the invention.

In FIG. 1 a valve housing block 10 contains an inlet 12 for a concentrated syrup and an inlet 14 for a diluent, usually plain or carbonated water.

Inlet 12 leads via a manual restrictor 16 to a passageway 18 which extends via a flow meter turbine 20 to meet a central passageway 22 extending through the block at right angles to passageway 18.

A piston 24 extends through passageway 22 from the drive shaft 26 of a stepper motor 28 at one end of the passageway 22 to an outlet 30 leading into a mixing nozzle 32 at the other end of passageway 22. Immediately prior to outlet 30 piston 24 engages in the central bore of a valve block 34. The block has a pair of V-grooves 36 diametrically opposed across its central bore and extending axially of the bore. The grooves taper almost to the outlet 30 end of valve 34, leaving a short portion 34A at the outlet end of the block defining a short cylindrical bore portion, and commence, i.e. at their wider end, at the far end of the valve away from outlet 30.

When piston 24 is in its lowermost position as shown, it completely closes the central bore of valve 34, thereby closing outlet 30 into the nozzle 32. When the piston is raised by the stepper motor the valve 34 is opened to allow flow through the V-grooves. The flier the piston is raised, the greater the degree of opening through the grooves.

Inlet 14 leads to a passageway 38 which extends via a flow meter turbine 40 to meet central passageway 22 above valve 34 but below the junction between that passageway and passageway 18. Water call, therefore, flow from inlet 14 via passageway 38, turbine 40 and valve 34, when that valve is opened, through outlet 30 and into nozzle 32.

Piston 24 carries an annular seal 42 which seals against the wall of passageway 22. When the piston is positioned to close valve 34, seal 42 lies between the junction of passageways 18 and 22 and the junction of passageways 38 and 22. Between seat 42 and the junction of passageways 38 and 22 a syrup outlet passageway 44 extends from passageway 22 into nozzle 32.

When piston 24 is raised sufficiently that seal 42 passes beyond the junction of syrup passageway 18 and central passageway 22, syrup can flow via central passageway 22 into outlet passageway 44 into nozzle 32. This movement of the piston, of course, also at least partly opens valve 34 to allow water flow through grooves 36. It will be apparent from FIG. 1 that on initial movement upwardly of piston 24 opens valve 34 to a small degree before seal 42 rises sufficiently to allow syrup to flow. Further upward movement of the piston increases water flow as the wider portions of the grooves become exposed whereas the syrup outlet orifice remains constant once it has been initially set by means of adjuster 16.

The short section 34A of block 34 also carries a seal 46 through which piston 24 sealingly extends to ensure no leakage of water through valve 34 in the closed position. Piston 24 also carries a seal 48 to prevent passage of syrup from central passageway 22 into water passageway 38 and an upper seal 50 to prevent syrup leakage from the upper end of passageway 22.

Figure 2:
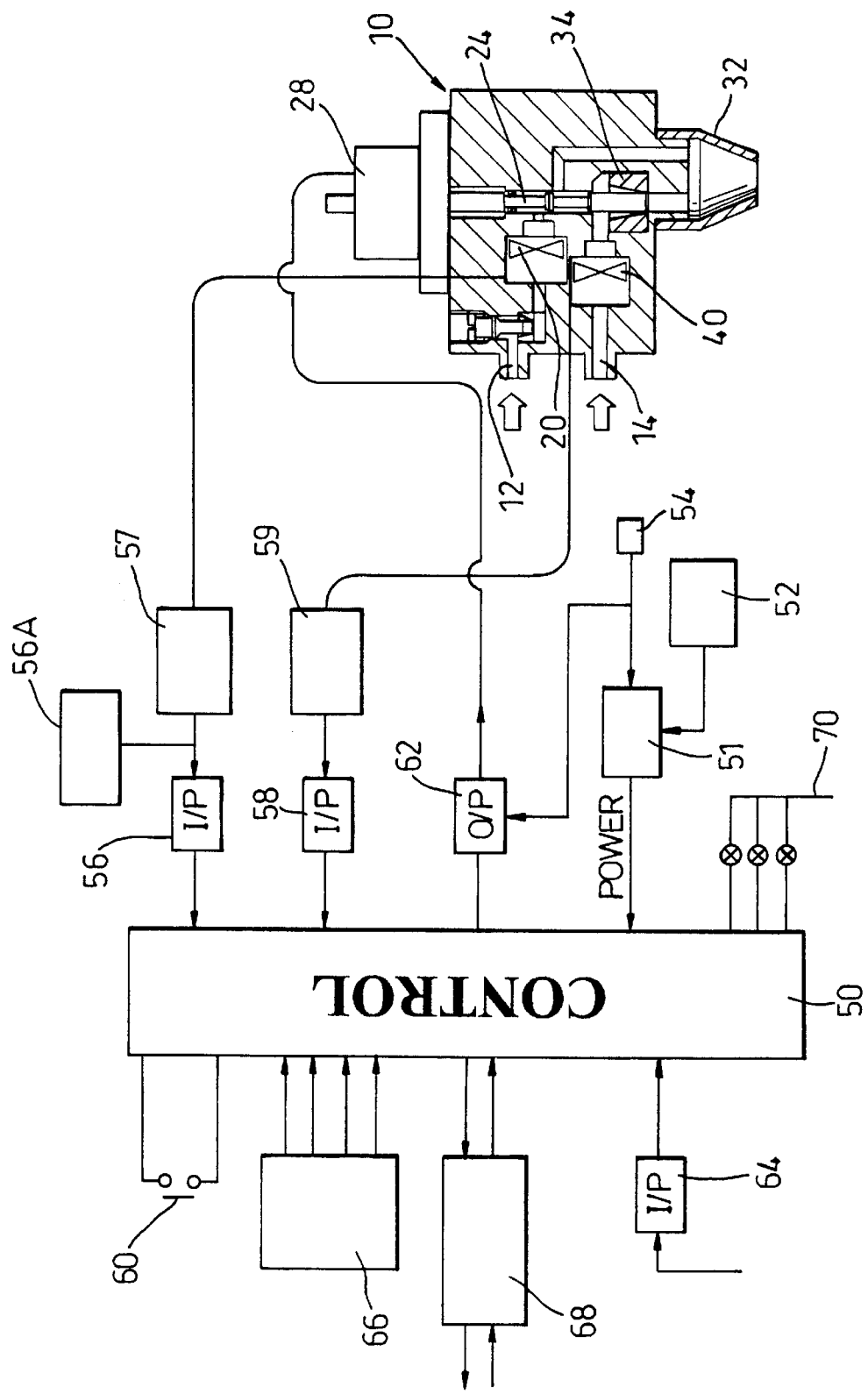
FIG. 2 is a block diagram showing one specific arrangement of the dispense means of the invention.

FIG. 2 shows one arrangement of control mechanisms for the valve housing of FIG. 1.

The pre-programmed control board 50 is powered by a 24 volt power supply PSU 51. This has a long life battery back up 52 to enable completion of a dispense and closure of the valve in the event of a power failure. The long life battery back up could of course be replaced by, e.g. a rechargeable battery or a capacitor. A power input means 54 may be any convenient means. Other inputs (I/P) to the control board include input 56 from the syrup flow sensor 57, 20 as initially controlled by the manual flow rate setting 56A at installation and input 58 from the water sensor 59, 40. A dispense command actuates a dispense via output (O/P) 62 to the stepper motor 28. Optional inputs include input 64 which can be connected by known means to a conductive lever or other indicator in the cup into which the drink is dispensed to stop flow when a certain level of beverage in the cup is reached. A key pad optional input 66 can be used to order a dispense from a pre-programmed range of different beverages and portion sizes. A beverage ratio setting may also be included, option 68, and this input may also include data on the concentrate characteristics.

An optional output is an optical display, e.g. an LED display, to provide feedback to the user.

On the actuation of a dispense, the monitored syrup flow information fed back to the control board via input 56 enables the control board to calculate and control the required water rate flow and to monitor that flow via input 58. The control board via output 62 to stepper motor 28 causes piston 24 to move as required to provide the necessary degree of opening of valve 34 to result in the desired ratio of syrup to water in the nozzle 32.

Figure 3:
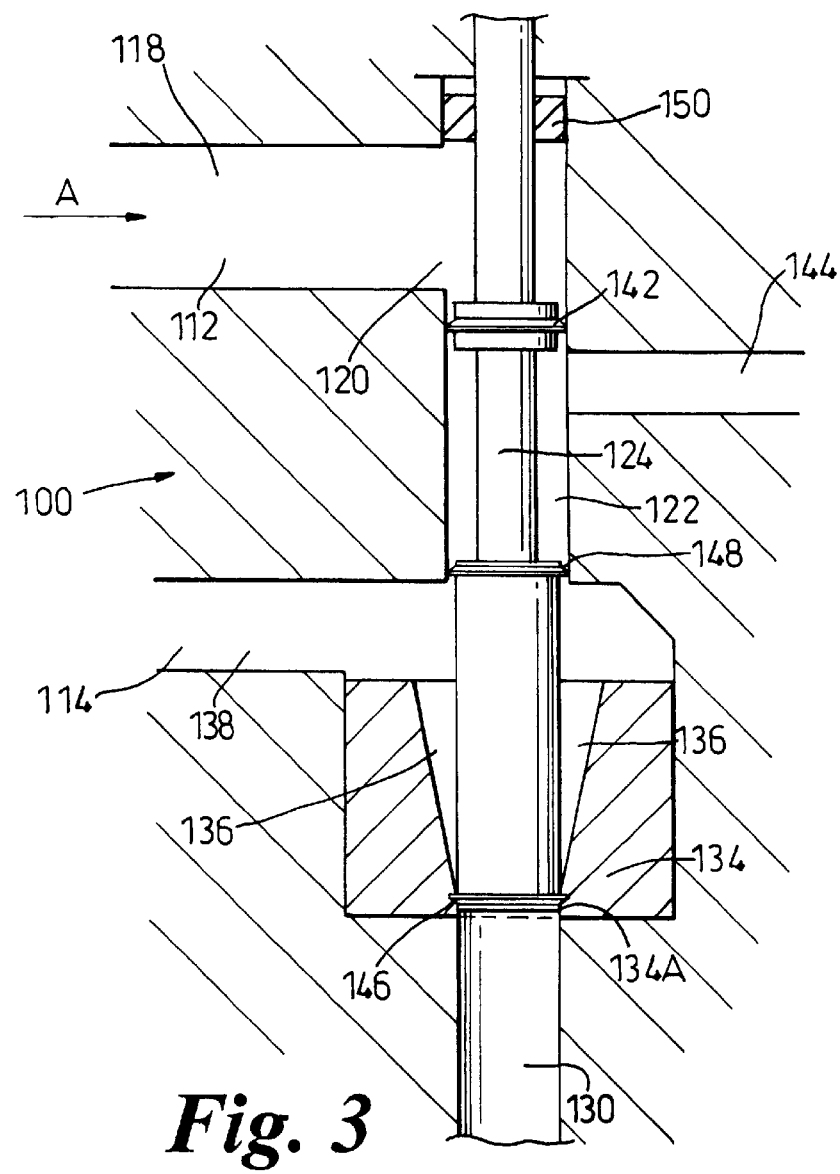
FIG. 3 is a part sectional diagrammatic representation of part of another valve housing of the invention.

In FIG. 3 valve housing block 100 contains an inlet 112 for a concentrated syrup and an inlet 114 for a diluent. Inlet 112 leads to a passageway 118 and inlet 114 leads to a passageway 138. It will be appreciated that both inlets will be provided with flow rate sensors, e.g. flow turbines as shown in FIG. 1, and that inlet 112 may be provided with a restrictor, e.g. a manual restrictor as shown in FIG. 1.

Passageway 118 extends through a triangular slot 120, which has its apex 120' lowermost, to meet a central passageway 122 extending through the block at right angles to passageway 118.

As with the FIG. 1 construction, a piston 124 extends through passageway 122 to an outlet 130, which can lead to a mixing nozzle (not shown). Immediately prior to outlet 130 piston 124 engages in the central bore of a valve block 134. The block has a pair of V-grooves 136 diametrically opposed across its central bore and extending axially of the bore. The grooves taper almost to the outlet 130 end of valve 134 leaving a short portion 134A at the outlet end of the block defining a short cylindrical bore portion and commence, i.e. at their widest end, at the far end of the valve away from outlet 130.

When piston 124 is in its lowermost position as shown, it completely closes the central bore of the valve 134, thereby closing outlet 130. When the piston is raised by a setting mechanism (not shown), valve 134 is opened to allow flow through the V-grooves. The further the piston is raised, the greater the degree of opening through the grooves.

As indicated above, inlet 114 leads to a passageway 138 which extends to meet central passageway 122 above valve 134 but below the junction between that passageway and passageway 118. Water can, therefore, flow from inlet 114 via passageway 138, and valve 134, when that valve is opened, through outlet 130.

Piston 124 caries an annular seal 142 which seals against the wall of passageway 122. When the piston is positioned to close valve 134, seal 142 lies between the junction of passageways 118 and 122 and the junction of passageways 138 and 122. Between seal 142 and the junction of passageways 138 and 122 a syrup outlet passageway 144 extends from passageway 122 into the mixing nozzle (not shown).

The short section 134A of block 134 carries a seal 146 through which piston 124 sealingly extends to ensure no leakage of water through valve 134 in the closed position. Piston 124 carries a seal 148 to prevent passage of syrup from central passageway 122 into water passageway 138 and an upper seal 150 to prevent syrup leakage from the upper end of passageway 122.

When piston 124 is raised sufficiently that seal 142 passes beyond the junction of syrup passageway 118 and central passageway 122, syrup can flow via slot 120 and central passageway 122 into outlet passageway 144. This movement of the piston, of course, also at least partly opens valve 134 to allow water flow through grooves 136. Further upward movement of the piston increases water flow as the wider portions of the grooves become exposed whereas the syrup outlet orifice remains constant once it has reached its fully open position.

Figure 4A:
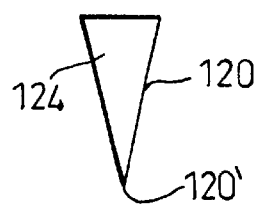
FIG. 4A is a simplified view in the direction of arrow A of FIG. 3 showing a triangular slot of a concentrated syrup outlet in the closed configuration.
Figure 4C:
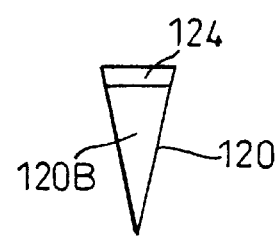
FIG. 4C is a similar view to FIG. 4A in an almost fully opened configuration.
Figure 4B:
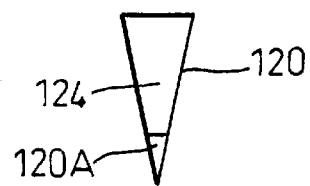
FIG. 4B is a similar view to FIG. 4A in an initially opened configuration.

Stages of the opening of slot 120 are shown in FIGS. 4A, 4B and 4C.

In FIG. 4A, the piston 124 is in its lowermost closed position as shown in FIG. 3. The piston can be seen through the slot but flow is prevented by the blockage of passageway 122 by seal 142. When the piston is raised so that seal 142 moves above the apex 120' of the slot, a small area 120A of the slot is open for flow (FIG. 4B). As the piston is raised further a greater area 120B of the slot 120 is open to flow FIG. 4C) and further raising of the piston will allow flow through the fill area of the slot.

This arrangement enables a "soft" start to the syrup concentrate flow, i.e. the flow rate may be increased gradually to the desired fill rate.

It will also be noted in the FIG. 1 and FIG. 3 arrangements that, should seals 48, 148 and/or seals 42, 142 fail, the diluent and/or concentrate can flow through outlet 44, 144 which acts as a vent to atmosphere thereby preventing cross-contamination of the diluent and concentrate.

In FIGS. 5 to 8 is shown an alternative valve housing of the invention.

The housing block 200 contains an inlet 212 for a concentrated syrup and an inlet 214 for a diluent. These inlets are visible in FIGS. 6 and 8. The concentrate inlet 212 leads via an initial passageway portion 218A to a second passageway portion 218B at right angles to portion 218A. Passageway portion 218B extends to meet a middle portion 222B of a central passageway 222A, 222B, 222C which extends in the block parallel to passageway portion 218A. A flow sensor (not shown) may be positioned in passageway portion 218A or 218B.

A piston 224 extends through central passageway 222A, 222B, 222C from the drive shaft 226 of a stepper motor 228 at one end of the passageway to an outlet 230 leading to a mixing nozzle (not shown) at the other end of the passageway.

At outlet 230 a closure member 232 on the end of piston 224 engages in the central bore of a valve block 234 in the valve closed positions of FIGS. 5 and 6. Block 234 has two pairs 236,237 of V-grooves, the grooves of each pair being diametrically opposed across its central bore and extending axially of the bore. The grooves are equi-spaced around the bore and grooves 237 extend for the full length of block 234 whereas grooves 236 extend for only about half of the length from the centre of the block to its upper end. By this means a particularly controlled increase in flow of diluent through the valve block can be achieved as the valve is progressively opened. The grooves taper towards outlet 230, i.e. their wider ends are further away from the outlet.

With piston 224 in its lowermost position, as shown in FIGS. 5 and 6, closure member 232 completely closes the central bore of block 234, thereby closing outlet 230. When the piston is raked by the stepper motor, valve 234 is opened to allow flow through firstly V-grooves 237 and then the V-grooves 236. The further the piston raises the closure member, the greater the degree of opening through the grooves.

Inlet 214 leads to a passageway 238 (which may also contain a flow sensor) and from there to a chamber 239 above outlet 230 and separated from the lower passageway portion 222A by a shelf 249—described fiber below. Diluent, usually water, can therefore flow from inlet 214 via passageway 238 and chamber 239 and valve 234, when open, through outlet 230.

As indicated above, the central passageway has an upper, a middle and a lower portion. The concentrate inlet feeds into middle portion 222B and the concentrate leaves from the upper end of lower portion 222A via outlet passageway 244A and 244B, the latter also leading to the mixing nozzle (not shown).

In the valve closed position piston 224 seals the passageway portion 222B from portion 222A, see FIG. 6. The piston has an upper cylindrical portion 224A separated from a lower cylindrical portion 224B by an annular shoulder 225 defining an annular recess 227. Recess 227 contains an annular seal 229 (shown for clarity in FIGS. 7 and 8 only). This seal in the valve closed position seals against the wall of passageway portion 222B at a chamfered wall portion 231 thereby preventing concentrate from passageway 218B from flowing into passageway portion 222A from portion 222B.

In the valve open position, piston 224 has moved upwardly so that its lower cylindrical portion 224B is now within middle passageway portion 222B (FIGS. 7 and 8) and seal 229 is no longer obstructing flow of concentrate. Concentrate can, therefore, flow from the central passageway middle portion 222B over the top of a diaphragm seal 248 into outlet passageways 244A and 244B and thence to the mixing nozzle. As shown in FIG. 7, the diaphragm in its extended position leaves a gap 241 between passageway portion 222B and outlet passageway 244A for concentrate flow.

Diaphragm seal 248 prevents concentrate from passing further down the central passageway to reach outlet 230. It is shown in its extended condition in the open configurations of FIGS. 7 and 8 and in its compressed condition in the closed configurations of FIGS. 5 and 6. Diaphragm seal 248 is of generally inverted cup-shape in extended condition and the rim, i.e. lower perimeter 248A, of the cup is sealingly attached to annular shelf 249 which has a lower perimeter skirt 249A resting on top of valve block 234, with closure member 232 passing through a central aperture in the shelf. The upper surface, i.e. the base of the inverted cup, 248B of the diaphragm seal has a central aperture through which lower piston portion 224B passes and the diaphragm is sealed to the piston around that aperture. The diaphragm thereby moves from its extended to its compressed position and vice versa with downward and upward movement of the piston.

To prevent concentrate from leaking upwardly from the upper end of upper central passageway portion 222C into the stepper motor, a second diaphragm seal 250, of similar shape and function to seal 248, is sealed to the upper end of piston 224. Again seal 250 is shown in its extended position in the open configuration of FIGS. 7 and 8 and in its compressed condition in the closed configuration of FIGS. 5 and 6.

It will be appreciated that the invention is not limited to the embodiments shown.

As indicated above, the outlet for the diluent may open marginally before the outlet for the concentrate. This maybe achieved for example, by appropriate sizing and positioning of the piston seals or by a well known spool and lost motion arrangement.

Also as indicated above, the control board may also have an input for a syrup temperature sensor so that the syrup flow rate can be calculated according to its viscosity. This may be a thermistor, preferably characterised at, say 0° C. for the dispense of cooled syrups. The dispense control may either incorporate a continuous dispense while a lever or push button is held in the operating position or a predetermined portion may be dispensed on actuation. Portion switches may, for example, include "large", "medium", "small" and "cancel".

The control means may conveniently be pre-programmed for "look-up" tables of syrup flow rates over the whole range, e.g. to give drink dispenses rates of from 1 to 10 ounces/second which, dependent on the beverage ratio required could equate to syrup flow rates of between 1 and 60 ml/sec.

Typical syrup to water ratios may be from 1:3 to 1:10.

In order to limit power consumption in use of the apparatus, "continuous" monitoring of the flow rates may be limited, for example, to once every 0.5 seconds.

The control board may also be provided with a fault detection input which may, for example, stop a dispense when a fault is detected and exit to a suitable fault routine. These routines may include "out-of-water" and "out-of-syrup" conditions and detected flow when the valve is turned off.

What is claimed is:

1. A beverage dispenser comprising a valve housing having an inlet and an outlet for a concentrate and an inlet and an outlet for a diluent, a reciprocal piston, said piston being movable in a central passageway between said inlets and outlets, the piston being movable reciprocally by a single linear drive means to a plurality of positions between and including a first closed position in which flow to both outlets is blocked, and a second fully open position in which both outlets are open to flow directly into a mixing and dispense nozzle, a first flow rate sensor for the concentrate and a second flow rate sensor for the diluent, the first and second sensors being connected to a controller and the controller connected to and controlling the operation of the linear drive means whereby the diluent flow rate is adjusted by movement of the piston in response to input from the first and second flow rate sensors to achieve a predetermined ratio of concentrate to diluent for the dispensed beverage.

2. A beverage dispenser according to claim 1, in which the first and second flow rate sensors are flow turbines.

3. A beverage dispenser according to claim 1, in which the outlet for the diluent includes a valve comprising a substantially rigid housing containing a passageway between an inlet and an outlet of the valve, a closure member movable in the passageway from a first position in which the valve is fully closed to a second position in which the valve is fully open, the closure member engaging the wall of the passageway to seal the passageway, the wall of the passageway and the closure member defining between them at least one groove, the groove having a transverse cross-section that increases in area in the downstream or upstream direction, whereby movement of the closure member from the first position towards the second position opens a flow channel through the groove.

4. A beverage dispenser according to claim 3, in which the groove is of a tapering V-shape.

5. A beverage dispenser according to claim 3, in which the reciprocating piston acts as the closure member for the valve passageway.

6. A beverage dispenser according to claim 1, in which the initial movement of the piston towards the second position partially opens the diluent outlet before the concentrate outlet is opened.

7. A beverage dispenser according to claim 6, in which at an intermediate position of the piston between the first and second positions, the diluent outlet is partially open and the concentrate outlet fully open and further movement of the piston from said intermediate position to the second position further opens the diluent outlet while the concentrate outlet remains fully open.

8. A beverage dispenser according to claim 1, in which the outlet for the concentrate comprises a passageway in the form of a slot of triangular shape having a narrow end and an opposite wide end, whereby movement of the piston from the first closed position opens the narrow end of the slot to a flow of concentrate and then further movement of the piston towards the second open position exposes an increasing area of the slot.

9. A beverage dispenser according to claim 1, in which a temperature sensor is provided to monitor the concentrate temperature and wherein the controller is programmed to interpret viscosity of the concentrate as a function of the sensed temperature thereof and thereby make any necessary adjustments of the piston position as is required to maintain the predetermined ratio of diluent to concentrate in response to any sensed changes in concentrate viscosity.

10. A beverage dispenser according to claim 1, in which the concentrate inlet is pre-set to provide a flow rate dependent on the type and volume of beverage to be dispensed.

11. A beverage dispenser according to claim 1, in which the controller is connected to an indicator positionable in a receptacle for the beverage to be dispensed whereby the dispense may be stopped when the dispensed beverage reaches a predetermined level in the receptacle.

12. A beverage dispenser according to claim 1, in which the controller is connected to a key pad input means whereby a dispense may be selected from a pre-programmed range of different beverages and portion sizes.

13. A dispenser for dispensing a final liquid composed of a liquid diluent portion and a liquid additive portion and maintaining a predetermined ratio between the two liquid portions, comprising:

a dispenser housing having an inlet and an outlet for the additive portion and an inlet and an outlet for the diluent portion, a reciprocable piston, said piston being movable in a central passageway between said inlets and outlets, the piston connected on a proximal end thereof to a single linear drive means the linear drive means for moving the piston to a plurality of positions between and including a first closed position in which flow to both outlets is blocked, and a second fully open position in which both outlets are open to flow there from into a mixing and dispense nozzle, and the outlet for the diluent portion, including a flow rate structure having a bore extending there through and located upstream of the mixing and dispense nozzle, and the piston having a distal end opposite from its proximal end, the distal end movable within the bore and having a closure tip end so that when the piston is in the first closed position the closure tip end thereof is seated against a seat of the flow rate structure for preventing any flow of the diluent portion downstream there from to the mixing and dispense nozzle and so that as the piston is moved towards the second fully open position, sidewalls of the piston proximal end are held closely adjacent a wall surface of the bore, and the wall surface of the bore having one or more grooves therein, the one or more grooves having a transverse cross-sectional area that increases in the upstream direction whereby movement of the piston from the first position towards the second position opens a flow channel of increasing cross-sectional area for adjusting the flow rate of the diluent portion, a first flow rate sensor for the additive portion and a second flow rate sensor for the diluent portion, the first and second sensors being connected to a controller and the controller connected to and controlling the operation of the linear drive means whereby the diluent portion flow rate is adjusted by movement of the piston in response to input from the first and second flow rate sensors to achieve and maintain a predetermined ratio of additive portion to diluent portion for the dispensed final liquid.

14. The dispenser as defined in claim 13, the one or more grooves of a tapering V-shape.

15. The beverage dispenser as defined in claim 1, and where initial movement of the piston from the first position towards the second position partially opens the diluent portion outlet before the additive portion outlet is opened.

16. The beverage dispenser as defined in claim 15, in which at an intermediate position of the piston between the first and second positions, the diluent portion outlet is partially open and the additive portion outlet fully open and further movement of the piston from said intermediate position towards the second position further opening the diluent portion outlet while the additive portion outlet remains fully open.

17. The beverage dispenser as defined in claim 13, and further including a temperature sensor for monitoring the additive portion temperature wherein the controller is programmed to interpret viscosity of the additive portion as a function of the sensed temperature thereof and thereby make any necessary adjustments of the piston position as is required to maintain the predetermined ratio of the diluent portion to the additive portion in response to any sensed changes in additive portion viscosity.

18. The beverage dispenser as defined in claim 13, and the additive inlet settable to provide a gross flow rate adjustment relative to a predetermined type and/or volume of final liquid to be dispensed.

19. The beverage dispenser as defined in claim 13, and the controller connected to an indicator positionable in a receptacle in which the final liquid is dispensed whereby the dispense of the final liquid may be stopped when the dispensed final liquid reaches a predetermined level in the receptacle.

20. The beverage dispenser as defined in claim 13, and the controller connected to an input means for selecting from a pre-programmed range of different beverages and/or portion sizes.

* * * * *